United States Patent [19]

Bader

[11] 3,961,560

[45] June 8, 1976

[54] CONTROL MEANS FOR JET AIRCRAFT THRUST REVERSING MEANS

[75] Inventor: Eberhard Bader, Munich, Germany

[73] Assignee: Motoren- und Turbinen-Union Munchen GmbH, Munich, Germany

[22] Filed: Oct. 30, 1974

[21] Appl. No.: 519,171

[30] Foreign Application Priority Data

Nov. 2, 1973 Germany............................ 2354747

[52] U.S. Cl. .............................. 91/358 R; 91/445; 91/448; 244/110 B
[51] Int. Cl.² ........................................ F15B 13/16
[58] Field of Search ........................ 244/81, 110 B; 239/265.37; 91/445, 461, 448, 358 R; 251/30, 305

[56] References Cited
UNITED STATES PATENTS

| | | | |
|---|---|---|---|
| 1,998,656 | 4/1935 | Bryan................................ | 251/30 X |
| 3,655,134 | 4/1972 | Greenland et al. ............ | 239/265.37 |

Primary Examiner—Trygve M. Blix
Assistant Examiner—Barry L. Kelmachter
Attorney, Agent, or Firm—Alan H. Levine

[57] ABSTRACT

Control arrangement including an actuator, such as an air motor, for operating the jet deflector flaps of a thrust reverser, and a pilot valve and a control valve for operating the actuator. The pilot valve controls flow of high pressure air from the jet engine to the control valve. The air flows through a first port in the control valve to the actuator. Air leaving the actuator flows through a second port in the control valve and then back to the pilot valve through which it is exhausted. A pilot valve member initially limits air flow through the second port, but as the flaps are deployed, the second port is gradually opened and the first port gradually closed. The operation is reversed to retract the flaps. The pilot valve may be operated by a switch responsive to contact of the nosewheel of the aircraft with a runway. The pilot and control valve may be included in a single cylindrical body with their valve members rotatable about the axis of the body.

7 Claims, 4 Drawing Figures

CONTROL MEANS FOR JET AIRCRAFT THRUST REVERSING MEANS

This invention relates to means for controlling the motion of the jet deflector flaps of a thrust reversing means for aircraft jet engines, between the retracted and deployed positions of the flaps.

Manual or automatic control systems for thrust reversing means have previously been proposed in which the jet deflector flaps are deployed electrically, pneumatically, or hydraulically into the engine thrust jet in response to a certain aircraft speed, to decelerate the aircraft, and restored to their retracted position upon completion of the thrust reversing process.

These previously proposed systems have the disadvantages of relatively elaborate construction, high cost, and relatively great weight. Another disadvantage associated with these systems is that despite the great input they inevitably require in engineering and production they are not likely to operate with precision under certain requirements, and they are susceptible to malfunction, especially in extended service.

Among the requirements referred to is that of immediate response of the thrust reversing means at touchdown, as when the nosewheel of the aircraft contacts with the landing strip.

Another requirement imposed is that of uniformly controlled motion of the thrust deflector flaps throughout their entire travel, i.e., prevention of exceedingly abrupt deploying movement which may impose considerable stresses on the entire thrust reversing system and its actuator.

Another requirement is that the rate of jet deflector motion must be slowed shortly before the flaps reach their deployed position for thrust reversal.

An operationally safe thrust reverser actuating system further contemplates secure locking of the thrust reversing means, or jet deflector flaps, and the actuator in each of its selected extreme positions.

Broadly speaking, it is an object of the present invention to provide a control means which meets the requirements of a thrust reverser actuating system, eliminates the disadvantages associated with the previously-mentioned systems, and which, more particularly, improves on known means of the type mentioned above such that it offers reliability and durability while being relatively simple in construction and relatively low in weight.

It is a further object of the present invention to provide control means which does not require observance of critical manufacturing tolerances in production.

It is another object of this invention to provide control means permitting simple and exact control of the starting and decelerating movements of the actuator for the thrust reversing means.

More specifically, the present invention provides a control means comprising a pilot valve and a control valve each having a rotatably mounted valve member in its cylindrical body. To deploy the jet deflector flaps of the thrust reversing means, the rotary member of the pilot valve is actuated first, causing a first valve chamber, defined in part by the rotary member of the pilot valve and pressurized with high-pressure air from the jet engine, to communicate with a first valve chamber defined in part by the rotary member of the control valve. The control valve chamber permits the passage, through a first port, of high-pressure air to the actuator, preferably an air motor. As a result, the actuator moves and operates the thrust reversing means. Simultaneously, control air from the actuator reaches, through a second port in the control valve which initially is slightly opened in advance by the rotary member, a second chamber defined in part by the control valve rotary member. The rotary control valve member responds to the actuating mechanism of the thrust reversing means and gradually opens the second port in the control valve body, as the flaps of the thrust reversing means are being deployed, while at the same time gradually closing the first port. Control air, escaping from the second control valve member, flows through a port opened by the rotary member of the pilot valve and into a second chamber defined in part by said rotary member, from which it is then exhausted.

Further objects and advantages of the present invention will become apparent from the following description, read in light of the accompanying drawings, in which.

Figure 1:
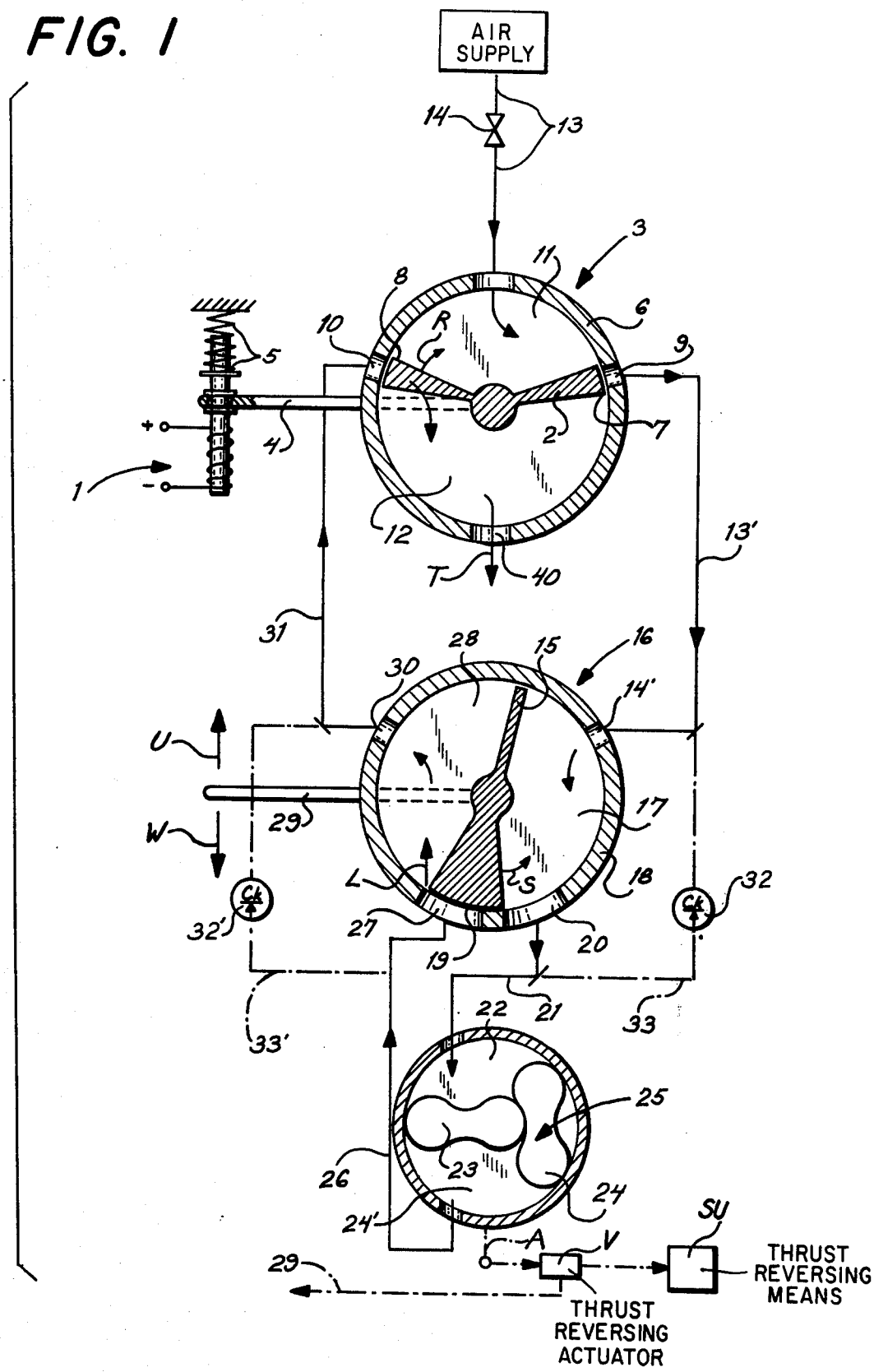
FIG. 1 is a schematic cross-sectional view, projected into the drawing plane, of control means in accordance with this invention, illustrating the control valve and the pilot valve as separate units.

With reference now to the embodiment of FIG. 1, the airplane pilot first primes the thrust reversing means by operating a pre-selector switch, which is not shown on the accompanying drawings. Then when the aircraft touches down upon the runway, a switch (not shown in the drawings) is tripped by perhaps the action of the nosewheel to energize the magnetic system 1 of FIG. 1 and urge an actuating lever 4, connecting to a rotary member 2 of a pilot valve 3, to turn clockwise (as viewed in FIG. 1) against the force of a restoring spring 5. This causes the rotary valve member 2 to rotate within the cylindrical body 6 of the pilot valve in the direction of arrowhead R until its edges 7 and 8 simultaneously clear the valve ports 9 and 10, respectively. The rotary member 2 of the pilot valve 3 divides the interior of the cylindrical valve body 6 into a first chamber 11 and a second chamber 12.

A line 13, which may or may not incorporate a pressure reducer 14, connects the first chamber 11 of the pilot valve 3 to the high-pressure air supply system of the engine. If the presure reducer 14 is used, its purpose is to prevent engine-caused fluctuations in the high-pressure air from affecting the functioning of the control means.

When the valve port 9 opens in the manner described above, high-pressure air escapes from the first valve chamber 11 into a line 13' which communicates through a valve port 14' with a first valve chamber 17 defined within a cylindrical valve body 18 by a rotary member 15 of a control valve 16.

In this operating phase the rotary member 15, or more precisely its edge 19, is clear of a first valve port 20 to allow high-pressure air to escape from the first valve chamber 17 of the control valve 16 into a line 21. The air flows through line 21 into a first chamber 22 of an air motor 25 essentially consisting of two cooperating displacement members 23 and 24. The control air, which then escapes from a second chamber 24' of the air motor 25, passes through a line 26, to a second port 27 of the control valve 16.

In the position shown in FIG. 1 of the rotary valve member 15, the second valve port 27 is already slightly open, allowing an initially relatively small portion of the control air to flow, in the direction of arrowhead L, into the the second valve chamber 28 defined within the cylindrical valve body 18 by the rotary member 15.

The air motor drives the thrust reversing means via a drive shaft A represented by a dot-dash line. The actuating mechanism V of the thrust reversing means cooperates with an actuating lever 29 of the control valve 16.

When the jet deflector flaps (not shown) of the thrust reversing means SU are being deployed, the rotary valve member 15, cooperating with the thrust reversing means via the actuating lever 29, is urged in the direction of arrowhead S until the first valve port 20 is sealed off completely to interrupt the flow of high-pressure air to the air motor 25. As the rotary valve member 15 goes through this motion, (in the direction of arrowhead W of actuating lever 29), the thrust deflector flaps of the thrust reversing means reach their fully deployed position. Also, during this movement of the rotary member 15 a portion of the control air in the second chamber 28 of the control valve 16 is being exhausted, from the second chamber 12 of the pilot valve 3 through a port 40 in the cylindrical valve body 6, in the direction of arrowhead T. For this purpose, the second valve chamber 28 of the control valve 16 communicates with the second chamber 12 of the pilot valve 3 through a valve port 30, a control air line 31, and a valve port 10.

The initially relatively narrow area of flow for control air through the second valve port 27, shown in FIG. 1 (arrowhead L), is preferred in that it prevents excessively rapid start-up of the air motor 25 and, thus, abrupt deployment of the thrust deflector flaps and the attendant intolerable loads on shafts and levers of the control means. In the event, however, that very rapid acceleration of the air motor 25 followed by relatively gentle slow-down near the other extreme position should be preferred, use can be made whenever a certain pressure of the high-pressure air is exceeded of single-acting check valves. This is represented by a check valve 32' in the scavenge line 33' tied between the control air lines 26 and 31, to bypass the control valve 16 should the rotary member 15 restrict the port 27.

When the thrust reversing means has reached its deployed position in this manner, provision can be made to keep the air motor 25, unless it is of the self-locking type, under a certain air pressure to immobilize the thrust reversing means in its selected extreme position. This can be achieved, using the means illustrated in FIG. 1, by allowing a small amount of air leakage through ports 9 and 10 when the rotary member 2 of pilot valve 3 is in its shut-off position over ports 9 and 10. When the thrust reversing means has attained its fully deployed position, the rotary valve member 2 is returned to its shut-off or neutral position, under the restoring force of spring 5, as soon as the solenoid of the magnetic system 1 is deenergized.

The thrust reversing means is retracted by using a reversed sequence from that described above. This is achieved by energizing the magnetic system 1 with reversed polarity, in response to, for example, a certain peripheral speed of the nosewheel. The actuating lever 4 is attracted by the magnetic system 1, causing the rotary valve member 2 to rotate counterclockwise to open the port 10. This supplies high-pressure air from the first chamber 11 through line 31 and the port 30 to the second chamber 28 of the control valve 16.

The high-pressure air thus escaping through the now open second port 27 of the control valve reaches, through the line 26, the second chamber 24' of the air motor 25, causing it to move in reverse. Control air is discharged through the line 21 and the first valve port 20, into the first chamber 17 of the control valve 16. From here it is routed through the port 14', line 13' and port 9, to the second chamber 12 of the pilot valve to be exhausted, again in the direction of arrowhead T, through the port 40. As has previously been described in connection with the deploying movement of the thrust reversing means, the control valve 16 can be bypassed also during this retracting movement by channeling the control air discharged by the air motor 25 along a more direct route through a line 33, a check valve 32 therein, and on through line 13', port 9, chamber 12, and port 40.

With continued reference to the retracting operation, as soon as the air motor 25 begins operating, it drives the thrust reverser actuating system V of the thrust reversing means SU by means of the drive shaft A, causing the actuating lever 29 cooperating with the actuating system V to rotate in the direction of arrowhead U. Consequently, the rotary valve member 15 rotates counter to the direction of arrow S until the second port 27 of the control valve 16 is completely sealed off.

Figure 4:
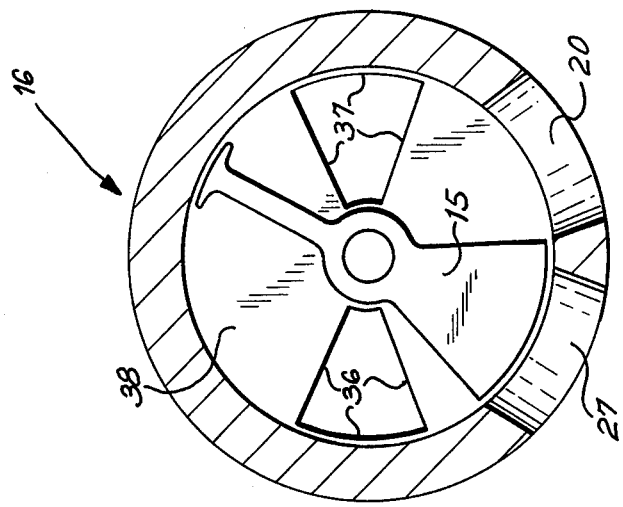
FIG. 4 is a cross-sectional view taken along line 4—4 of FIG. 2.
Figure 3:
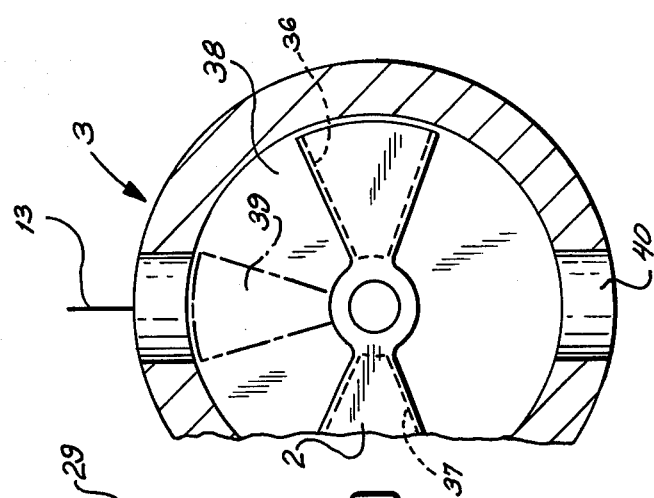
FIG. 3 is a cross-sectional view taken along line 3—3 of FIG. 2.
Figure 2:
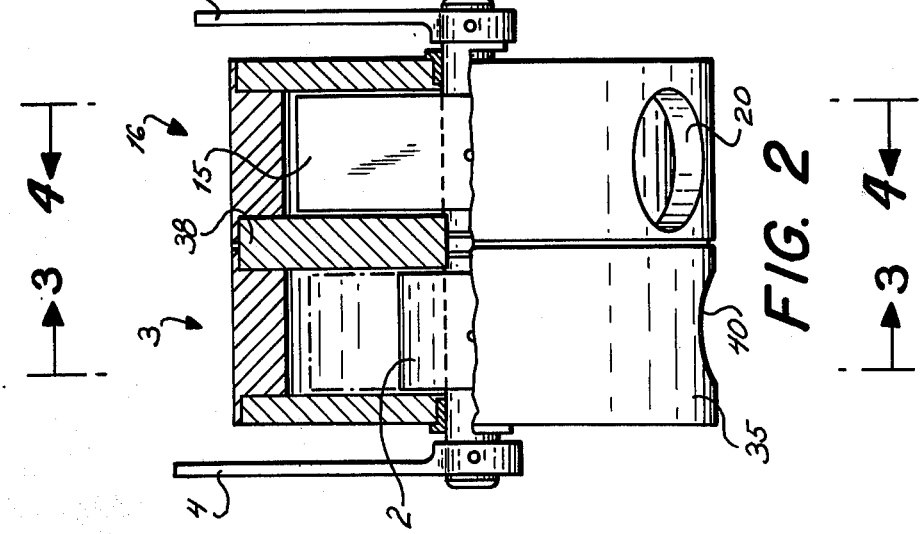
FIG. 2 is an elevational view of an embodiment of the control means in accordance with this invention, with parts broken away from the upper half, wherein the control valve and the pilot valve are combined into one assembly.

The embodiments illustrated in FIGS. 2, 3, and 4 use the same reference numerals for essentially unchanged details but depart from that of FIG. 1 in that the rotary member 2 of the pilot valve 3 and the rotary member 15 of the control valve 16 are combined into an assembly within a common valve body 35.

With reference now to FIG. 4, the ports 9, 10, and 14', 30, as well as the lines 13', 31, are replaced with two like, triangular through holes 36, 37 in a partition 38. The holes 36 and 37 are sealed off by the rotary valve member 2 (FIG. 3) when it occupies its neutral position.

As also indicated in broken lines in FIG. 3, the rotary valve member 2 can be fitted with an additional shut-off member 39, if especially effective sealing of the control means from the high-pressure air supply from the engine is an important consideration. This will eliminate undesirable engine losses when the control means is inoperative.

The inventive concept also embraces arrangements wherein in lieu of electromagnetic tripping as shown in FIGS. 1 to 4, the actuating lever 4 is positioned by means of pilot-controlled hydraulically, or pneumatically operated devices, or even mechanically by hand.

What is claimed is:

1. For use with a thrust reversing means of an aircraft jet engine having jet deflector flaps and a source of pressurized air, control means for controlling the movement of the flaps between their retracted position and their deployed position, said control means comprising:

a. an air-driven actuator for operating the thrust reversing means, said actuator having first and second ports,
b. a control valve having first and second ports communicating with the first and second ports of said actuator, and a control valve member almost completely covering said control valve second port while leaving said control valve first port substantially unobstructed when the flaps are in their retracted position, said control valve member defining within said control valve a first chamber communicating with said control valve first port and a second chamber communicating with said control valve second port,
c. a pilot valve having an inlet port connected to the pressurized air source, an exhaust port, a first port communicating with said control valve first chamber, a pilot valve member for controlling flow of pressurized air from the source to said control valve first chamber, and a second port communicating with said control valve second chamber, said pilot valve member having a neutral position in which it closes both of said pilot valve first and second ports, and said pilot valve member permitting communication between said pilot valve second and exhaust ports when said pilot valve member is adjusted to permit flow of pressurized air from the source to said control valve first chamber,
d. means for adjusting said pilot valve member to permit flow of pressurized air from the source to said control valve first chamber when the flaps are to be moved from their retracted to their deployed position, and
e. means responsive to operation of said actuator for moving said control valve member to gradually uncover said control valve second port and gradually close said control valve first port, so that during the initial movement of said actuator pressurized air flows freely through said control valve first port but flow through said control valve second port is limited, during the final movement of said actuator pressurized air flows freely through said control valve second port but flow through said control valve first port is limited, and during movement of said actuator between its initial and final movements pressurized air flows freely through said control valve first and second ports.

2. Control means as defined in claim 1 including an air line between said pilot valve first port and said control valve first chamber and an air line between said pilot valve second port and said control valve second chamber, said pilot valve member being arranged to open both of said pilot valve first and second ports simultaneously.

3. Control means as defined in claim 1 wherein said pilot valve member includes means for closing said inlet port when said pilot valve member is in its neutral position, said pilot valve member being arranged to open said pilot valve first, second, and inlet ports simultaneously.

4. Control means as defined in claim 1 including a by-pass line between said actuator second port and said pilot valve second port, and a check valve in said by-pass line permitting flow only in the direction toward said pilot valve.

5. Control means as defined in claim 1 including a by-pass line between said actuator first port and said pilot valve first port, and a check valve in said by-pass line permitting flow only in the direction toward said pilot valve.

6. For use with a thrust reversing means of an aircraft jet engine having jet deflector flaps and a source of pressurized air, control means for controlling the movement of the flaps between their retracted position and their deployed position, said control means comprising:
a. an air-driven actuator for operating the thrust reversing means, said actuator having first and second ports,
b. a control valve having first and second port communicating with the first and second ports of said actuator, and a control valve member almost completely covering said control valve second port while leaving said control valve first port substantially unobstructed when the flaps are in their retracted position, said control valve member defining within said control valve a first chamber communicating with said control valve first port and a second chamber communicating with said control valve second port,
c. a pilot valve having an inlet port connected to the pressurized air source, a first port communicating with said control valve first chamber, and a pilot valve member for controlling flow of pressurized air from the source to said control valve first chamber,
d. a common cylindrical body for said pilot and control valves, said pilot and control valve members being arranged for rotation about the axis of said body,
e. means for adjusting said pilot valve member to permit flow of pressurized air from the source to said control valve first chamber when the flaps are to be moved from their retracted to their deployed position, and
f. means responsive to operation of said actuator for moving said control valve member to gradually uncover said control valve second port and gradually close said control valve first port, so that during the initial movement of said actuator pressurized air flows freely through said control valve first port but flow through said control valve second port is limited, during the final movement of said actuator pressurized air flows freely through said control valve second port but flow through said control valve first port is limited, and during movement of said actuator between its initial and final movements pressurized air flows freely through said control valve first and second ports.

7. Control means as defined in claim 6 including a partition within said cylindrical body separating said pilot and control valves, a first opening in said partition to provide communication between said pilot valve first port and said control valve first chamber, and a second opening in said partition to provide communication between said pilot valve second port and said control valve second chamber.

\* \* \* \* \*